Oct. 21, 1952 — C. A. ELLIS — 2,614,255
EYE PROTECTIVE DEVICE
Filed June 22, 1950 — 3 Sheets-Sheet 2

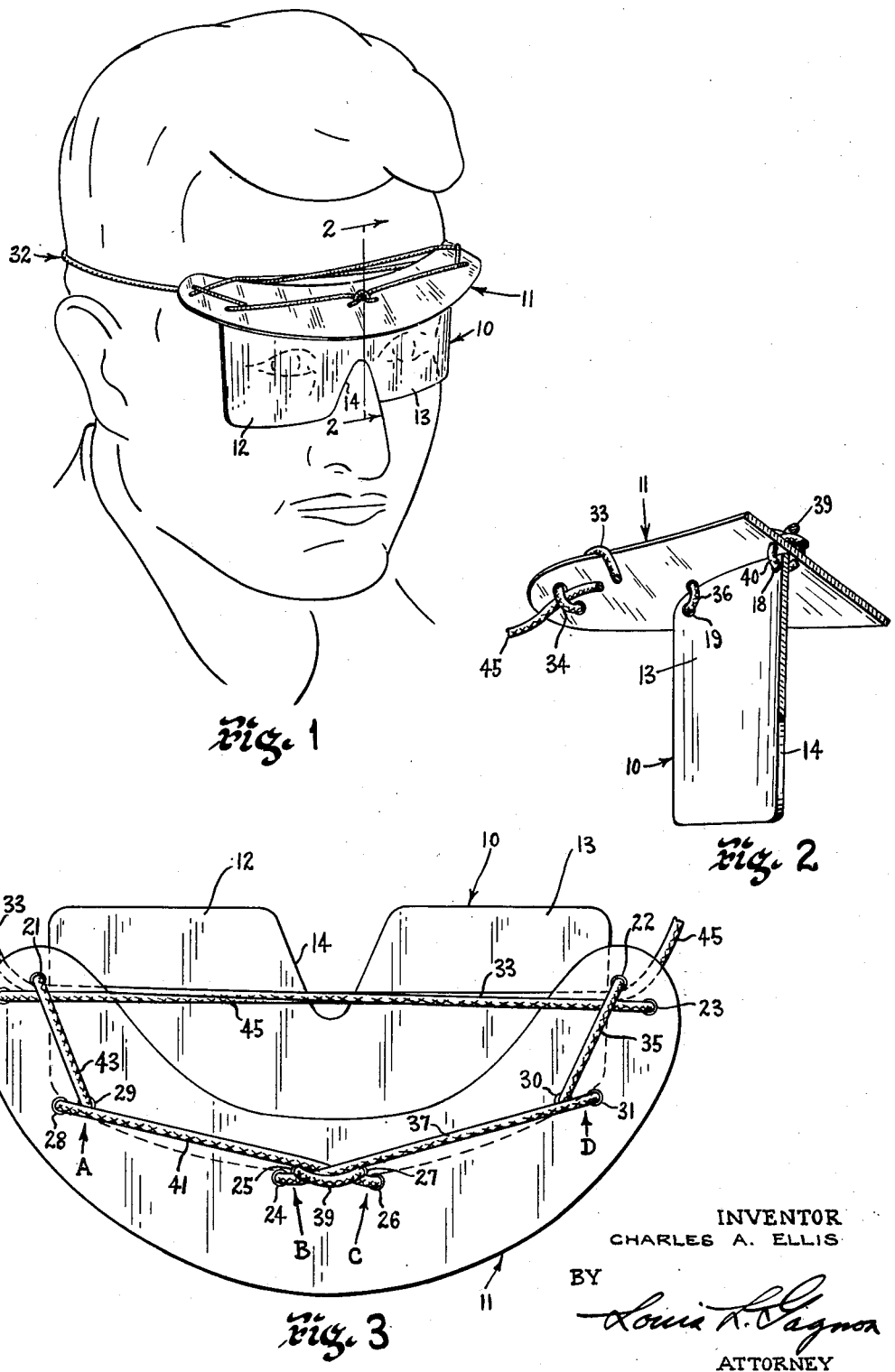

INVENTOR
CHARLES A. ELLIS
BY Louis L. Gagnon
ATTORNEY

Oct. 21, 1952  C. A. ELLIS  2,614,255
EYE PROTECTIVE DEVICE
Filed June 22, 1950  3 Sheets-Sheet 3

INVENTOR
CHARLES A. ELLIS
BY
Louis L. Gagnon
ATTORNEY

Patented Oct. 21, 1952

2,614,255

UNITED STATES PATENT OFFICE 2,614,255

EYE PROTECTIVE DEVICE

Charles A. Ellis, Southbridge, Mass., assignor to American Optical Company, Southbridge, Mass., a voluntary association of Massachusetts Application June 22, 1950, Serial No. 169,669

12 Claims. (Cl. 2—12)

This invention relates to eye protective devices and has particular reference to transparent eye shields combined with sun shades or visors.

The prior art teaches the formation of various types of eye protective devices for filtering light directed toward a person's eyes for protecting the eyes from undesirable rays of the sun, some of which teach the use of sun shields which are adjustably secured to shades or visors of various kinds. However, most of the prior art devices are objectionable for one or more reasons, but among them being poor ventilation, awkward size and shape, poor construction, discomfort to wearers, and poor light filtering characteristics.

The present invention overcomes these and other objections to prior art devices and has as a principal object the provision of an eye protective device embodying a combined eye shield and sun visor so constructed and arranged that it can be made to assume a flat, unobjectionable shape for easy handling, storing, and packaging, and can be shaped to comfortably fit the wearer's individual facial characteristics by controlling the length of a headband whereby a curvature is provided in the visor, whereupon a desired curvature is automatically assumed by the eye shield, with the headband serving also as means for connecting the eye shield to the visor, and as means for spacing the inner edge of the visor from the forehead of the wearer to insure proper ventilation and to provide additional safety and comfort to the wearer.

Another object is to provide an eye protective device of the character aforesaid wherein the eye shield and the visor are formed of plastic material having light polarizing characteristics, with the axis of polarization of the visor being at right angles to the axis of polarization of the eye shield, thereby imparting exceptional light filtering characteristics to the device.

Another object is to provide eye protective devices of the above character wherein the eye shields, visors and headbands are each individually decoratively colored to provide novel and attractive devices such as will appeal to wearers, particularly to feminine sports enthusiasts, while also functioning efficiently for the intended purposes.

Another object is to provide a device of the above character with a headband having novel means associated therewith for automatically adjusting the headband to the head of a wearer and retaining continuous yieldable tension in the headband to add to the comfort of the wearer and to retain the device in adjusted position on the head of the wearer.

Other objects and advantages will become apparent from the following description taken in connection with the accompanying drawings in which;

Fig. 1 is a perspective view of a eye protective device embodying the invention shown in position of use on the head of the wearer;

Fig. 2 is the vertical section of the device taken substantially on line 2—2 of Fig. 1 and looking in the direction of the arrows;

Fig. 3 is a top plan view of the device shown collapsed;

Figure 6:
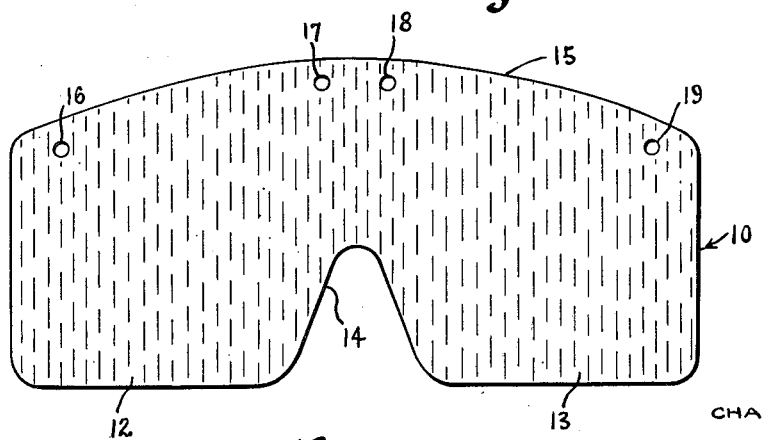

Referring to the drawings wherein like characteristics of reference designate like parts throughout the several views, the preferred embodiment of the invention comprises separate eye shield and visor elements 10 and 11 respectively each of which are individually preferably formed of flexible transparent plastic sheeting which may be provided with suitable light absorbing characteristics. The eye shield element 10 is initially formed as a single, flat member as shown in Fig. 6, having a pair of contiguously related eye portions 12 and 13 separated in the lower region of the shield by a notch 14 whereby the shield may be positioned over the nose of the wearer, and with a curved upper contour edge 15. The shield 10 is provided adjacent its upper contour edge 15 with a plurality of perforations 16, 17, 18 and 19 for connection of the visor 11 thereto, the perforations 16 and 19 being located in the upper corners of the shield while the perforations 17 and 18 are located in adjacent relation substantially centrally of the shield above the notch 14.

Figure 5:
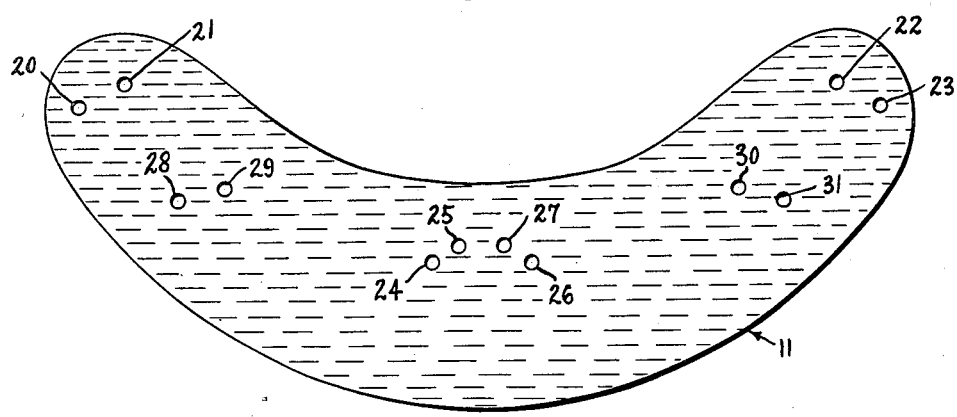
Figs. 5 and 6 are illustrations showing diagrammatically the contour shapes, perforations and light polarizing axes respectively of the visor and eye shield.

The visor element 11 is initially formed flat, is arcuately shaped as shown in Fig. 5, and is also provided with suitable light absorbing characteristics and with a pluarlity of perforations for connection of the shield 10 thereto. A pair of spaced angularly disposed perforations 20—21 are located adjacent one end thereof and a similar pair of spaced angularly disposed perforations 22—23 are provided adjacent the other end of the visor 11. Adjacent the central portion of the visor 11 are located two spaced pairs of angularly disposed perforations 24—25 and 26—27, the perforations 25 and 27 being located between and slightly rearwardly of the perforations 24 and 26. A pair of spaced perforations 28—29 is also placed between the pairs of perforations 20—21 and 24—25, while a similar pair of spaced perforations 30—31 are located intermediate the pairs of perforations 22—23 and 26—27.

Figure 4:
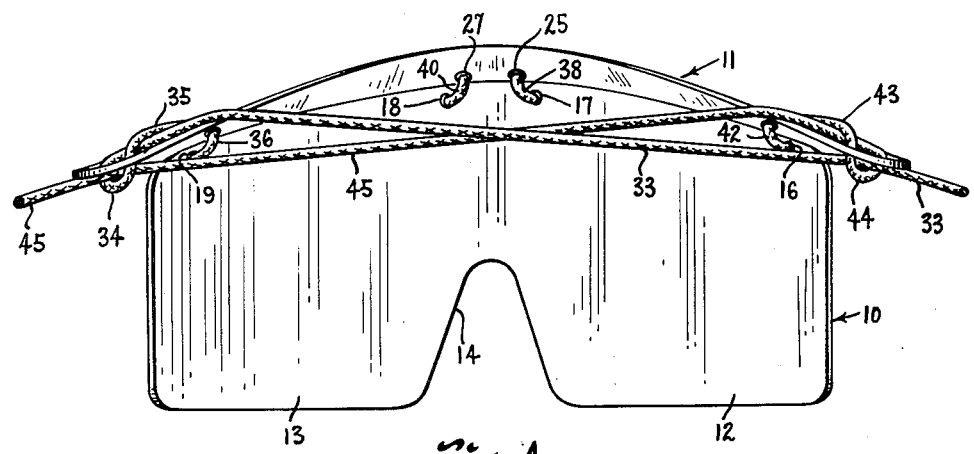
Fig. 4 is a rear view of the device.

A headband 32, preferably in the form of a cord of suitable color design to harmonize with the ensemble, is used to hingedly connect the visor and shield elements together. In assembling the device one end portion 33 of the cord is threaded downwardly through visor perforation 23 and thence upwardly through perforation 22 to form an underlying cord portion 34 (Figs. 2, 3 and 4). From perforation 22 the cord extends along the upper surface of the visor (portion 35) to perforation 30 where it extends downwardly and passes from the rear (portion 36) through shield perforation 19, then upwardly through visor perforation 31. From this point it extends across the upper surface of the visor (portion 37) to visor perforation 24.

It will be noted here that perforations 30 and 29 are located slightly forwardly of adjacent perforations 31 and 28 whereby the shield, when being opened to position of use, will be urged by the adjacent underlying cord portions into a rearwardly curved shape. The cord then passes downwardly through perforation 24 and from the front (portion 38) passes through shield perforation 17, from which it extends upwardly through visor perforation 25. To complete the central hinge connection, the cord (portion 39) then extends over portion 37 and passes downwardly through perforation 27, then from the rear (portion 40) through shield perforation 18 and upwardly through visor perforation 26. From this point the cord (portion 41) passes beneath portions 37 and 39 to perforation 28, where it extends downwardly, then rearwardly through shield perforation 16 and upwardly (portion 42) through visor perforation 29 to form the third hinge connection.

From this point the cord (portion 43) extends along the upper surface of the shield to perforation 21, where it passes downwardly and then (portion 44) upwardly through perforation 20. To complete the assembly the remaining end portion 45 is extended beneath cord portion 43 and from there extends across the space between the end portions of the shield formed by the arcuate shaping thereof and, passing beneath the opposed end portion, is threaded between the lower surface of the shield and the cord portion 34. The opposed cord end portion 33 is also made to span the space between the shield end portions and to similarly extend between the under surface of the shield and the cord portion 44. By drawing the portions 33 and 45 of the cord tight, this will cause the cord loop portions 44 and 34 to frictionally retain the cord in place.

With such an arrangement, the shield 10 is satisfactorily hinged to the visor 11 at four points, designated A, B, C and D in Fig. 3, whereby when the cord portions 33 and 45 are relatively loose, the shield and visor elements can be made to assume a flat, easily packaged arrangement. It will be noted that the perforations in the visor 11 for the hinge connections are so arranged that they define a substantially arcuate aligned relation. Thus, there is no straining or binding introduced when arranging the elements for efficient compact packaging.

Also, by locating the end perforations 22—23 and 20—21 angularly in the visor 11 as shown and described, tightening of the cord end portions 33 and 45 will cause the visor end portions to be drawn toward one another and thus will curve the visor 11. Such curving of the visor 11 will automatically cause a rearward curving of the shield 10. This adjustment to curve the visor and shield can be controlled to suit the individual facial characteristics of the wearer and the device will retain its curved shape, due to the frictional retention of the cord in the hinge areas, until the cord is loosened.

It will be understood that with the above arrangement, the cord portions 33 and 45, rather than the edge of the visor, will engage the forehead of the wearer, thus providing increased comfort and greater safety to the wearer. Also, by doing this, there is formed a substantial space between the visor and the wearer's forehead which permits better ventilation.

A device having exceptional light filtering characteristics can be made by providing the visor 11 with light polarizing characteristics wherein the axis of polarization extends in a predetermined direction substantially as shown by the dash lines in Fig. 5, and by providing the shield 10 with light polarizing characteristics wherein the axis of polarization is substantially at right angles to the axis of polarization of the visor 11 and is such as to reduce reflected glare as from a road surface or the like, substantially as indicated by dash lines in Fig. 6. Thus, light passing only through the eye shield 10 to a wearer's eyes will be filtered to the extent of the polarization and color provided in the shield, while light rays passing through both the visor 11 and shield 10 will be still further filtered due to the crossed axes of polarization of the two elements.

It is important to note that a device constructed in accordance with the foregoing description is extremely light in weight and therefore comfortable to wear. Also, by providing the visor, shield and headband elements in various colors, it is also possible to provide an interesting, appealing, and cosmetically desirable device.

Figure 7:
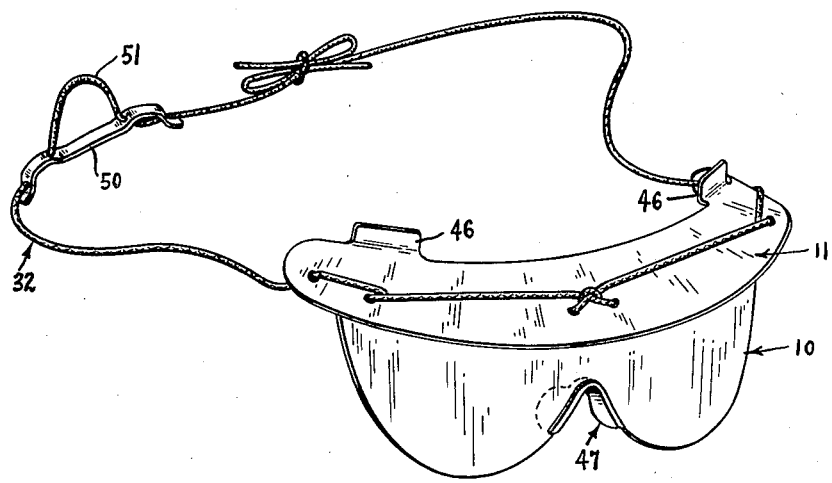
Fig. 7 is a perspective view of a modification of the invention.
Figure 8:
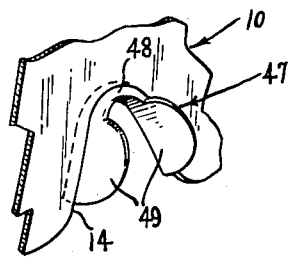
Figs. 8 and 9 are fragmentary perspective views of modifications of the nasal portions of the device.

Referring to Fig. 7 there is shown a modification wherein the inner curved edge of the visor 11 is provided with a pair of spaced integral tab portions 46 which are adapted to extend toward the forehead of the wearer and are curved upwardly so that when the device is worn the flat inner surfaces of the tab portions 46 will engage the forehead as cushions and space the edge of the visor therefrom. With such a construction it is not necessary that the headband cord be so attached that it will act as cushioning means upon the forehead as aforesaid.

Figure 9:
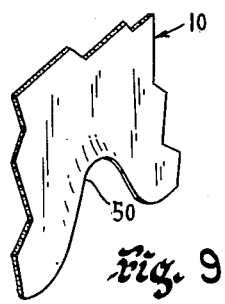

Further, the eye shield 10 may, if desired, be provided with a nose support 47 formed preferably as a plastic member having a bridge portion 48 and integral nose pads 49 on either side thereof, with a groove being provided therein for receiving the contour edge of the notch 14 and in which the support 47 is cemented, or the edge of the notch 14 may be flared out as shown at 50 in Fig. 9 to insure a more comfortable fit upon the wearer's nose and obviating cutting of the nose by a sharp edge in case the device is subjected to a blow or other form of stress.

When using one of the presently described devices, the cord 32 is adapted to extend around the head of the wearer and the ends tied or otherwise satisfactorily connected together. However, means may be provided for adjusting a cord 32 to an individual's head and retaining tension therein. Such means is shown in Fig. 7 and embodies an elongated strip 50 of rubber or other elastic material having a pair of longitudinally spaced openings adjacent each end. The cord 32 is threaded from the rear through one of the openings nearest one end of the strip 50, then rearwardly through the adjacent opening. From there it passes from the rear through the inner of the other pair of openings, then rearwardly through the remaining opening. The cord is made to form a loop 51 between the inner openings in the strip 50. Thus the tension on the cord on either side of the strip 50 will cause the strip to elongate, because of its inherent elasticity, to the extent permitted by the size of the loop 51. With such a construction, however, it is desirable that the openings in the elastic strip 50 be maintained as small as possible for efficiently gripping the cord. The elastic strip 50 may also be used with the head band of the device shown in Figs. 1 through 4.

It is to be understood that the contour shapes of the visor and eye shield elements can be controlled during the fabrication of these elements to any desired design or configuration.

From the foregoing it will be seen that all of the objects and advantages of the invention have been accomplished by providing a multiple-piece eye protective device of a novel construction and arrangement of parts whereby the resultant device has improved light filtering characteristics, improved ventilation and comfort to the wearer, and a compact easily packaged shape, with still further means being provided for easily and efficiently adapting the device to fit the head of the wearer.

While the novel features of the invention have been shown and described and are pointed out in the annexed claims, it will be understood that many changes may be made in the details of construction shown and described without departing from the spirit of the invention. I, therefore, do not wish to be limited to the exact details shown and described as the preferred only are set forth by way of illustration.

I claim:

1. In an eye protective device of the character described, visor means having perforations arranged therein, eye shield means embodying transparent light altering portions and having perforations arranged along its upper edge, and an elongated flexible member threaded through said perforations for hingedly connecting said eye shield means to said visor means and having its remaining portion sufficient to extend about the head of a wearer to form a headband for attaching the device to the head of a wearer.

2. In an eye protective device of the character described, visor means, eye shield means, embodying transparent light altering portions, said means having perforations therein and an elongated flexible member threaded through said perforations for hingedly connecting said eye shield means to said visor means and having a further portion extending between the ends of one of said means to provide means for engagement with the forehead of the wearer.

3. In an eye protective device of the character described, visor means having an arcuately shaped rear contour edge, eye shield means hingedly connected to said visor means and embodying transparent light altering portions and having an arcuate shaped upper contour edge, said eye shield means having perforations located adjacent each upper corner thereof and centrally thereof adjacent its arcuate upper contour edge, said visor means having a plurality of pairs of perforations therein arranged in a substantially arcuate fashion, and an elongated continuous flexible member connected to said visor means and eye shield means as to hingedly connect said visor means and eye shield means whereby when said flexible member is relatively loose said means may be arranged in a substantially parallel flat compact arrangement and when tension is exerted upon said flexible member the visor means will be made to curve and to automatically cause a rearward curving of said eye shield means.

4. In an eye protective device of the character described, visor means having an arcuately shaped rear contour edge, eye shield means hingedly connected to said visor means and embodying transparent light altering portions and having an arcuately shaped upper contour edge, said eye shield means having perforations located adjacent each upper corner thereof and centrally thereof adjacent its arcuate upper contour edge, said visor means having a plurality of pairs of perforations therein arranged in a substantially arcuate fashion, and an elognated continuous flexible member connected to said visor means and so arranged in the perforations in said visor means and eye shield means as to hingedly connect said visor means and eye shield means whereby when said flexible member is relatively loose said means may be arranged in a substantially parallel flat compact arrangement and when tension is exerted upon said flexible member the visor means will be made to curve and to automatically cause a rearward curving of said eye shield means, said flexible member further having portions spanning the space between the ends of the visor means and adapted to space the rear contour edge thereof from the forehead of the wearer when in position of use and simultaneously serving as cushioning means for aiding in supporting the device on the head of the wearer.

5. In an eye protective device, transparent visor means, and transparent eye shield means hingedly connected to said visor means, said visor means and said eye shield means each having light polarizing characteristics wherein the axis of polarization of the eye shield means is crossed with respect to the axis of polarization of the visor means.

6. In an eye protective device, transparent visor means, and transparent eye shield means hingedly connected to said visor means, said visor means and said eye shield means each having light polarizing characteristics wherein the axis of polarization of the eye shield means is crossed with respect to the axis of polarization of the visor means, and an elongated flexible member connected to said visor means and having a portion thereof hingedly connecting said visor means to said eye shield means and having another portion formed to a headband for attaching the device to the head of a wearer.

7. In an eye protective device, transparent visor means, and transparent eye shield means hingedly connected to said visor means, said visor means and said eye shield means each having light polarizing characteristics wherein the axis of polarization of the eye shield means is crossed with respect to the axis of polarization of the visor means, and an elongated flexible member connected to said visor means and having a portion thereof hingedly connecting said visor means to said eye shield means and having another portion formed to a headband for attaching the device to the head of a wearer, said flexible member having still another portion thereof adapted to engage the forehead of the wearer when in position of use and spacing the adjacent edge of the visor means therefrom.

8. In an eye protective device of the character described, visor means having an arcuately shaped rear contour edge, eye shield means hingedly connected to said visor means and embodying transparent light altering portions and having an arcuately shaped upper contour edge, said eye shield means having perforations located adjacent each upper corner thereof and centrally thereof adjacent its arcuate upper contour edge, said visor means having a plurality of pairs of perforations therein arranged in a substantially arcuate fashion, and an elongated continuous flexible member connected to said visor means and so arranged in the perforations in said visor means and eye shield means as to hingedly connect said visor means and eye shield means whereby when said flexible member is relatively loose said means may be arranged in a substantially parallel flat compact arrangement and when tension is exerted upon said flexible member the visor means will be made to curve and to automatically cause a rearward curving of said eye shield means, said visor means and said eye shield means each having light polarizing characteristics wherein the axis of polarization of the eye shield means is crossed with respect to the axis of polarization of the visor means.

9. In an eye protective device of the character described, visor means, eye shield means embodying transparent light altering portions, said means having perforations therein, an elongated flexible member having a portion threaded through said perforations for hingedly connecting said eye shield means to said visor means and having a further portion extending from opposed sides of said means when so connected sufficient to form a headband for attaching the device to the head of a wearer, and tension adjusting means connected to said further portion of the flexible member comprising a flat elongated elastic member having a pair of openings adjacent each end thereof through which said further portion of the flexible member is threaded, with the portion of the flexible member between the inner of said openings being of a predetermined length to control the extent to which the elastic member may be elongated.

10. In an eye protective device of the character described, visor means having an arcuately shaped rear contour edge, eye shield means embodying transparent light altering portions and having an arcuately shaped upper contour edge, said eye shield means having perforations located adjacent each upper corner thereof and centrally thereof adjacent its arcuate upper contour edge, said visor means having a plurality of pairs of perforations therein arranged in a substantially arcuate fashion, an elongated continuous flexible member connected to said visor means and so arranged in the perforations in said visor means and eye shield means as to hingedly connect said visor means and eye shield means whereby when said flexible member is relatively loose said means may be arranged in a substantially parallel flat compact arrangement and when tension is exerted upon said flexible member the visor means will be made to curve and to automatically cause a rearward curving of said eye shield means, and tension adjusting means connected to said flexible member comprising a flat elongated elastic member having a pair of openings adjacent each end thereof through which said flexible member is threaded, with the portion of the flexible member between the inner of said openings being of a predetermined length to control the extent to which the elastic member may be elongated.

11. In an eye protection device of the character described, visor means having an arcuately shaped rear contour edge, shield means having perforations located along its upper contour edge, said visor means having a plurality of perforations therein arranged in a substantially arcuate fashion, and an elongated flexible member threaded through said perforations in the visor means and eye shield means as to hingedly connect the eye shield means to the visor means and having its remaining portion forming a headband to fit about the wearer's head when the device is in position of use, said flexible member when relatively loose permitting said means to be arranged in a substantially parallel flat relation and when tension is exerted thereon, causing the eyeshield to cup and assume an angular relation with respect to the visor means.

12. In an eye protection device of the character described, visor means having an arcuately shaped rear contour edge, shield means having perforations located along its upper contour edge, said visor means having a plurality of perforations therein arranged in a substantially arcuate fashion, and an elongated flexible member threaded through said perforations in the visor means and eye shield means as to hingedly connect the eye shield means to the visor means whereby when said flexible member is relatively loose said means may be arranged in a substantially parallel flat relation and when tension is exerted thereon the eye shield will be caused to cup and assume an angular relation with respect to the visor means, and said flexible member further having portions spanning the space between the ends of the visor means so as to space the rear contour edge thereof from the forehead of the wearer when in position of use.

CHARLES A. ELLIS.

REFERENCES CITED

The following references are of record in the file of this patent:

UNITED STATES PATENTS

| Number | Name | Date |
| --- | --- | --- |
| 710,670 | Cutler et al. | Oct. 7, 1902 |
| 1,313,469 | Crossley | Aug. 19, 1919 |
| 1,382,698 | Tileston | June 28, 1921 |
| 2,247,971 | Snell | July 1, 1941 |

FOREIGN PATENTS

| Number | Country | Date |
| --- | --- | --- |
| 290,771 | Great Britain | May 24, 1928 |